(12) United States Patent
Galewski

(10) Patent No.: US 7,112,646 B2
(45) Date of Patent: Sep. 26, 2006

(54) PROCESS AND DEVICE FOR MANUFACTURING AN AROMATIC ALKYLENE POLYMER

(75) Inventor: Jean-Marc Galewski, Noeux-les-Mines (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 10/485,100

(22) PCT Filed: Jul. 10, 2002

(86) PCT No.: PCT/GB02/03156

§ 371 (c)(1),
(2), (4) Date: Jan. 29, 2004

(87) PCT Pub. No.: WO03/011916

PCT Pub. Date: Feb. 13, 2003

(65) Prior Publication Data

US 2004/0220382 A1 Nov. 4, 2004

(30) Foreign Application Priority Data

Jul. 30, 2001 (FR) .................................. 01 10170

(51) Int. Cl.
*C08G 63/00* (2006.01)
(52) U.S. Cl. ...................... 528/272; 422/131; 528/271; 528/480
(58) Field of Classification Search ................ 422/131; 528/271, 272, 480
See application file for complete search history.

(56) References Cited

U.S. PATENT DOCUMENTS 3,536,787 A 10/1970 Street
3,886,049 A 5/1975 Bir et al.

FOREIGN PATENT DOCUMENTS

| EP | 0 499 599 A2 | 8/1992 |
| WO | WO 96/27634 | 9/1996 |

*Primary Examiner*—Terressa Boykin
(74) *Attorney, Agent, or Firm*—Finnegan, Henderson, Farabow, Garrett and Dunner, L.L.P.

(57) ABSTRACT

The present invention relates to a process and a device for the continuous manufacture of a polymer of an aromatic alkylene monomer e.g. styrene comprising a bulk polymerisation of the monomer and a devolatilization of the resulting polymer in at least two successive steps so as to separate the polymer from the unreacted monomer and the oligomers formed during the polymerisation. The process comprises conveying a first gas stream resulting from the first step of the devolatilization into a first zone Z1 for direct condensation and fractionation, removing a gas stream G1 comprising essentially the monomer from the top of Z1, and removing a liquid stream L1 rich in oligomers from the bottom of Z1, a portion of L1 being taken, cooled and then returned into Z1. It also comprises conveying a second gas stream resulting from the second step of the devolatilization into a second zone Z2 for direct condensation and fractionation, this zone being also fed with the other portion of L1, removing a gas stream G2 comprising the monomer from the top of Z2, and removing a liquid stream L3 comprising essentially the oligomers from the bottom of Z2. The process and the device are particularly suitable for continuously manufacturing a styrene polymer, a styrene copolymer having a high impact strength modified by grafting onto a rubber, an expandable polystyrene or an expanded polystyrene. The invention is useful for improving the separation of the unreacted monomer from the oligomers and the quality of the polymer when the unreacted monomer thus separated is recycled e.g. to the polymerisation.

26 Claims, 2 Drawing Sheets

PROCESS AND DEVICE FOR MANUFACTURING AN AROMATIC ALKYLENE POLYMER

BACKGROUND OF THE INVENTION

The present invention relates to a process and a device for the continuous manufacture of a polymer of an aromatic alkylene such as styrene, especially comprising a step of recovering the unreacted monomer.

It is known practice to continuously manufacture aromatic alkylene polymers by a process of bulk polymerization, in particular a homopolystyrene or a copolymer of styrene having a high impact strength ("HIPS") and which is especially modified by grafting onto a rubber. In such a process, the polymer is first continuously prepared by a bulk polymerization in the liquid monomer. This thus gives a mass of polymer melt, dispersed in the liquid monomer, which is then subjected to degassing, generally known by the term devolatilization. The aim of the devolatilization is to remove from the polymer the unreacted monomer and volatile compounds, such as oligomers formed especially during the polymerization and possibly hydrocarbon-based impurities accompanying the monomer, which are generally inert and have a low boiling point, such as, for example, ethylbenzene (EB), cumene, n-propylbenzene (NPB), methylcyclohexane (MCH) and ethyltoluene (ET).

It is known practice to perform the devolatilization in one or, preferably, at least two successive steps, under a pressure which is generally less than atmospheric pressure, as is described in American patents U.S. Pat. No. 3,853,672, U.S. Pat. No. 3,903 202 and U.S. Pat. No. 3,928,300 and in European patent application EP 0 323 428. The devolatilization gives one or more streams of gas, separated from the polymer, generally comprising the unreacted monomer and volatile compounds which may be recovered, for example, by condensation. The amount of monomer thus recovered is generally so large that it is necessary for economic reasons to recycle the monomer, for example into the polymerization.

In continuous process, it is thus understood that the recycling of the monomer inevitably results in an increase in the concentration of volatile compounds and especially of oligomers in the polymerization medium. In order to maintain the quality of the polymer produced at a high level, it has become necessary to monitor and limit the amount of oligomers returned into the polymerization, and it is therefore important to separate out and remove the oligomers from the monomer recovered during the devolatilization, before returning the monomer, for example, into the polymerization. A process has already been proposed for separating the oligomers from the monomer by means of a distillation performed according to a type of "delayed" operation ("off-line processing"). However, this process has many drawbacks, especially as regards the flexibility of a continuous process for manufacturing a polymer, the consistency of the quality of the polymer manufactured and the cost of the process.

American patent U.S. Pat. No. 3,886,049 describes a process for separating the oligomers from the monomer, on-line with a process for the continuous manufacture of an aromatic alkylene polymer comprising a devolatilization of the polymer in two successive steps. The gas stream resulting from the first step of the devolatilization feeds a first zone known as a "first contacting and separation or stripping zone" in which a gas phase relatively rich in monomer is separated from a liquid phase. The gas phase is recovered at the top of the first zone and is returned after condensation into the polymerization. The liquid phase which is relatively rich in oligomers is recovered at the bottom of the first zone and is then partly returned into the top of the first zone and partly removed via a purge or even returned into the polymerization. The gas stream resulting from the second step of the devolatilization feeds a second zone known as a "second contacting zone" in which the gas stream is placed in direct contact with a liquid stream derived from a portion of the liquid leaving at the bottom of this zone, after having been cooled beforehand and optionally supplemented with a fresh supply of liquid monomer. The second zone behaves essentially and solely as a direct-contact condenser, such that the gas stream feeding this zone is totally condensed and forms an entirely liquid phase. This entirely liquid phase leaves at the bottom of the second zone and is then cooled. A portion of the entirely liquid phase is then returned into the second zone, such that all of the gas stream feeding this zone is condensed. The other portion of the entirely liquid phase is sent into the first zone in which it is placed in direct contact with the gas stream resulting from the first step of the devolatilization.

It has been observed that the process described by American patent U.S. Pat. No. 3,886,049 does not make it possible to achieve a sufficiently effective separation between the oligomers and the monomer, and that the monomer thus separated out still contains relatively large amounts of oligomers, such that the polymer thus manufactured is of relatively mediocre quality.

A process has now been found for overcoming the difficulties mentioned above. In particular, a process has been found for the continuous manufacture of an aromatic alkylene polymer, comprising a devolatilization in at least two successive steps, and a method which is sufficiently effective for continuously separating the oligomers from the monomer in the gas streams resulting from the devolatilization, so as to be able to recover the monomer with a very low content of oligomers, for example a content of less than 1%, preferably less than 6.1% or even less than 0.01% by weight.

SUMMARY OF THE INVENTION

The present invention relates to a process for the continuous manufacture of an aromatic alkylene polymer, comprising a bulk polymerization of the aromatic alkylene so as to form a mass of polymer melt which is then subjected to a devolatilization in at least two successive steps so as to separate the polymer from the unreacted monomer and the oligomers formed at least partially during the polymerization, this process being characterized in that:

a first gas stream separated from the polymer in the first step of the devolatilization is conveyed to a first zone Z1 for direct condensation and fractionation, a gas stream G1 comprising essentially the monomer is removed from the top of Z1, while a liquid stream L1 rich in oligomers is removed from the bottom of Z1, a portion of the liquid stream L1 being taken from, cooled and then returned into Z1 so as to partially condense by direct contact the first gas stream in Z1, a second gas stream separated from the polymer in the second step of the devolatilization is conveyed into a second zone Z2 for direct condensation and fractionation, this zone also being fed with the other portion of the liquid stream L1 derived from Z1 so as to partially condense by direct contact the second gas stream in Z2;

a gas stream G2 comprising the monomer is removed from the top of Z2, while a liquid stream L3 comprising essentially the oligomers is removed from the bottom of Z2.

The present invention also relates to a process and a device for continuously recovering monomer in a process for manufacturing an aromatic alkylene polymer, comprising a bulk polymerization of the aromatic alkylene so as to form a mass of polymer melt which is then subjected to a devolatilization in at least two successive steps, so as to separate the polymer from the unreacted monomer and the oligomers formed at least partly during the polymerization. The process and the device for the continuous recovery of the monomer are in all respects identical to the process and the device described previously and subsequently.

DETAILED DESCRIPTION OF THE INVENTION

Figure 1:
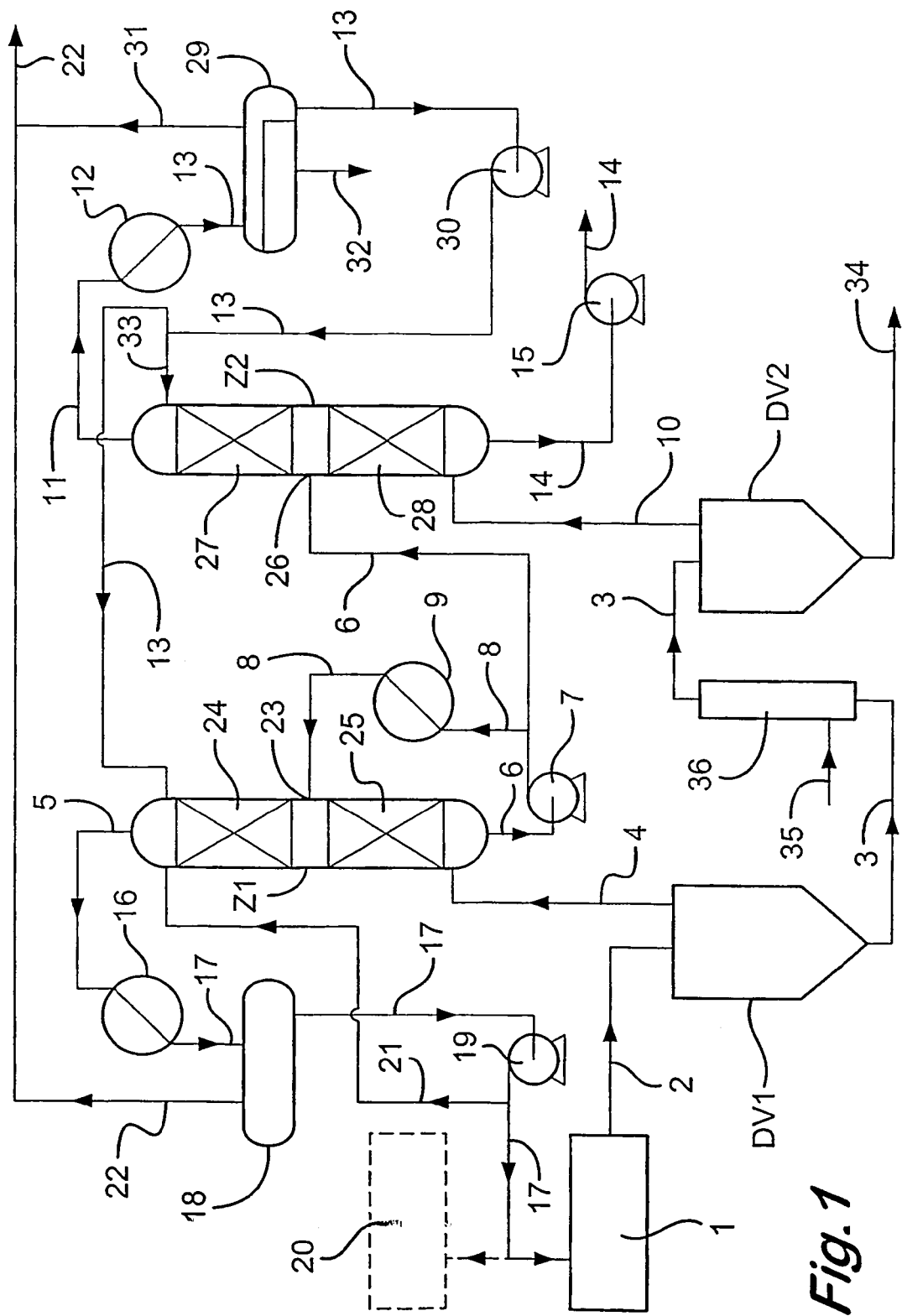
FIGS. 1 and 2 diagrammatically show processes and devices for carrying out the present invention, especially processes and devices for the continuous manufacture of an aromatic alkylene polymer, and/or processes and devices for the continuous recovery of monomer in such a manufacture.

According to the present invention, it may be particularly advantageous to recover at least some of the gas stream G1 removed from the top of Z1, especially after condensation and optionally cooling (or even supercooling), then to recycle it, preferably in the form of a liquid stream, directly or indirectly into the polymerization of the aromatic alkylene, and/or to convey it, preferably in the form of a liquid stream, directly or indirectly into an aromatic alkylene manufacturing unit. Moreover, at least one (other) portion of the gas stream G1 may be advantageously recovered and returned, after condensation and optionally cooling (or even supercooling), in the form of a liquid stream into Z1, preferably into the top part (or top half) of Z1, and especially into the top of Z1, so as to intensify in particular the liquid/gas direct contact in Z1 and thus to improve the extraction of the heaviest compounds, especially the oligomers, in the gas stream resulting from the first step of the devolatilization. Under these conditions, the top part (or top half) of Z1 may advantageously function according to an improved method for extracting the oligomers.

Before its return into Z1, the portion taken from the liquid stream L1 removed from the bottom of Z1 may be advantageously cooled to a temperature such that the resulting mixture in Z1 at the point of return of L1 is at a temperature close to its dew point. Thus, the portion of Z1 which is in the region of and especially below the point of return of the portion taken from L1 may function according to a "saturation" mode. The cooling of the portion taken from L1 has the advantage of reducing or even avoiding any unwanted polymerization and/or oligomerization in Z1. The portion taken from L1 may also be cooled with the purpose especially of monitoring and controlling the level of liquid in Z1 and in particular in the bottom of Z1. Under these conditions, the part of Z1 which is below the point of return of the portion taken from L1 may function according to an improved mode of direct condensation (and/or especially of saturation) by liquid/gas contact. The point of return of the portion taken from L1 may be in the central part of Z1. It may in particular be at a point of Z1 such that it delimits in Z1 two distinct parts by their function:

a top part (or top half) for "fractionation" or "extraction" of the heaviest compounds, especially the oligomers, which especially ends at the top by the removal of the gas stream G1 comprising essentially the monomer, and a bottom part (or bottom half) for "direct condensation" (and/or especially for saturation) in which, especially, the first gas stream resulting from the first step of the devolatilization is partially condensed (and/or especially saturated) by liquid/gas direct contact, by virtue in particular of the return of the portion taken from the cooled L1, and which is especially at the bottom by the removal of the liquid stream L1 rich in oligomers.

The top part of Z1 (known as the "fractionation" or "extraction" part) may correspond to a height, ranging from the point of return of the portion taken from L1 up to the top of Z1, equivalent to a number of theoretical plates ranging from 1 to 15 and preferably from 1 to 6. With the aim of improving the direct condensation in Z1, it is preferable to introduce the first gas stream resulting from the first step of the devolatilization into the part of Z1 which is below the point of return of the portion taken from L1 into Z1, preferably in the bottom part (or bottom half) of Z1, and especially at the bottom of Z1. The zone Z1 may advantageously function in the absence of any conventional heating means, especially placed at the bottom of Z1, for example in the absence of a boiling vessel. Such an absence also has the advantage of reducing or avoiding any unwanted polymerization and/or oligomerization in Z1.

It has been observed that when the devolatilization is performed in at least two successive steps, an appreciable amount of the oligomers (about 20 to 40% of the total amount of oligomers existing in the polymer before devolatilization) is still present in the mass of the polymer melt after the first step of the devolatilization.

According to the present invention, the second gas stream resulting from this second step is conveyed into a second zone Z2 having the two-fold function of direct condensation and fractionation. Moreover, one of the essential elements of the present invention is that of feeding Z2 with the other portion of the liquid stream L1 derived from the bottom of Z1, which is rich in oligomers. In particular, the other portion of the liquid stream L1 feeds Z2 at a point in Z2 which is preferably above the point in which the second gas stream resulting from the second step of the devolatilization feeds Z2, and in particular in a point which is in the central part of Z2. Moreover, the second stream resulting from the second step of the devolatilization preferably opens into the bottom part (or the bottom half) of Z2, and especially into the bottom of Z2.

The point into which Z2 is fed with the other portion of the liquid stream L1 may be in a point of Z2 such that it delimits in Z2 two separate parts by their function:

a top part (or top half) for "fractionation" or "extraction" of the heaviest compounds, especially the oligomers, and which especially ends at the top by removal of the gas stream G2 comprising the monomer, and a bottom part (or bottom half) for "direct condensation" (and/or especially for "saturation") in which especially the second gas stream resulting from the second step of the devolatilization is partially condensed (and/or especially saturated) by liquid/gas direct contact, in particular by means of sending the other portion of L1 into Z2, and which especially ends at the bottom by removing the liquid stream L3 comprising essentially the oligomers.

The top part of Z2 (for "fractionation" or "extraction") may correspond to a height, ranging from the point in which Z2 is fed with L1 up to the top of Z2, equivalent to a number of theoretical plates ranging from 1 to 15 and preferably from 1 to 6. The bottom part of Z2 can also function according to a "saturation" mode, especially by means of sending the other portion of the liquid stream L1 into Z2.

According to the present invention, the gas stream G2 comprising the monomer is removed from the top of Z2. The gas stream G2 may advantageously be recovered, especially after condensation and optionally cooling (or even supercooling), so as to form a liquid stream L2. This stream may be conveyed directly or indirectly into the polymerization of the aromatic alkylene and/or into a unit for manufacturing the aromatic alkylene. However, it is preferable that the liquid stream L2 is at least partly conveyed directly or indirectly into Z1, preferably into the top part (or the top half) of Z1, especially into the top of Z1. The other part of the liquid stream L2 may be advantageously returned into Z2, preferably into the top part (or the top half) of Z2, especially into the top of Z2, and in particular so as to intensify the liquid/gas direct contact in Z2 and to improve the extraction of the heaviest compounds, especially of the oligomers in Z2.

The gas stream G2 removed from the top of Z2 may be advantageously condensed, optionally cooled (or even supercooled) and also fractionated, for example by phase separation (especially of a liquid phase and a gas phase) or by decantation (especially between two immiscible liquid phases). In particular, such a fractionation may be performed so as to separate from the liquid stream L2 any readily fractionable or insoluble (or immiscible) compound in the monomer, and especially thus to isolate a purified liquid stream L2 essentially comprising the monomer, before, for example, returning it into the polymerization and/or into the unit for manufacturing the aromatic alkylene, or returning it, preferably, into Z1 and optionally returning it into Z2. It is possible, for example, to separate and remove from the liquid stream L2 any additive or any extraction agent (stripping agent) used especially during the devolatilization, or more particularly added to the polymer between the two, successive steps of the devolatilization, with the aim of facilitating the separation between the polymer and the volatile compounds. Among the additives or stripping agents used, mention may be made of water and carbon dioxide. The water may, for example, be separated out and removed from the liquid stream L2 by decantation, on account of the fact that the water forms an insoluble (immiscible) liquid phase in the monomer. The carbon oxide may, for example, be separated out and removed from the liquid stream L2 by phase separation, on account of the fact that the carbon dioxide can generally remain gaseous at the time of the condensation and the optional cooling of the gas stream G2.

According to the present invention, it may be particularly advantageous to convey into Z1 at least some of the liquid stream L2 comprising essentially the monomer recovered from the second step of the devolatilization and freed of most of the heaviest compounds, especially the oligomers. Thus, it is possible, at the top of Z1, to collect and concentrate all of the monomers originating from the two steps of the devolatilization, freed of the oligomers. The gas stream G1 removed from the top of Z1 may then be recovered, especially after condensation and optionally cooling (or even supercooling), in the form of a liquid stream comprising essentially the monomer with an extremely low oligomer content, especially of less than 1%, preferably of less than 0.1% or even less than 0.01% by weight.

Another interesting aspect of the present invention is that of being able to collect and concentrate in a single point of the process, in particular in the bottom of Z2, all of the oligomers recovered from the two steps of the devolatilization. It is particularly advantageous thus to remove from the bottom of Z2 a liquid stream L3 comprising essentially the oligomers freed of the monomer and having, for example, an extremely low monomer content, preferably of less than 10%, especially less than 5%, in particular less than 1% or even less than 0.5% by weight. The liquid stream L3 is generally discharged from the process and may be, for example, readily recovered and even upgraded in other processes or applications, especially either as energetic material in an incinerator, a boiler or a power station, or as starting material in a thermal or catalytic cracking unit capable of manufacturing allanes or olefins. The extremely low monomer content of the liquid stream L3 shows just how efficient the present process is at separating out the unreacted monomer from the oligomers, and just how much the yield for the manufacture of an aromatic alkylene polymer may be raised, in particular when the monomer recovered in the gas stream G1 is recycled directly or indirectly into the polymerization of the aromatic alkylene.

The process of the present invention is particularly advantageous when, between the two successive steps of the devolatilization, a stripping agent is added to the polymer melt, which is preferably chosen from compounds that are insoluble (or immiscible) in the monomer, and especially chosen from carbon dioxide and, preferably, water, in an amount ranging from 0.5% to 5% and especially from 1% to 3% by weight relative to the polymer. The mixture thus formed from the polymer melt with the stripping agent is preferably produced in a static mixer, before being subjected to the second step of the devolatilization. It is particularly advantageous to use superheated water, for example at a temperature of 180 to 240° C., since the superheated water can then simultaneously act as stripping agent to facilitate the devolatilization and as a heat supply especially in the functioning of the second zone Z2, thus improving the thermal balance of this zone and thus making it possible to avoid the use of a boiling vessel at the bottom of Z2.

However, although the process does not comprise the addition of a stripping agent during the devolatilization, superheated steam may be added to the mass of the polymer melt during the second step of the devolatilization, or preferably to the second gas stream resulting from the second step of the devolatilization, before or after its introduction into Z2, or especially directly into the second zone Z2, and more particularly at the bottom of Z2. In any case, the superheated steam thus added acts essentially as a supply of heat into Z2, advantageously improves the thermal balance of this zone, and also facilitates the separation between the monomer and the oligomers in this zone. The zone Z2 may thus advantageously function in the absence of any conventional means of heating, especially arranged at the bottom of Z2, for example in the absence of a boiling vessel. Such an absence has the advantage of reducing or avoiding any unwanted polymerization and/or oligomerization in Z2.

The process of the present invention leads to the continuous production of an aromatic alkylene polymer. The expression "aromatic alkylene polymer" generally means aromatic alkylene homopolymers and copolymers containing at least 50% by weight of aromatic alkylene. The term "aromatic alkylene" generally means vinyl aromatic monomers, in particular styrene monomers, for example styrene or alpha-methylstyrene. The copolymers may be copolymers of an aromatic alkylene with a nitrile, in particular acrylonitrile, such as a copolymer of styrene with acrylonitrile (SAN) or a copolymer of acrylonitrile-butadiene-styrene (ABS), or a copolymer of styrene with an acrylic or methacrylic acid ester, or alternatively a styrene copolymer having a high impact strength ("HIPS") in particular modified by grafting onto a natural or synthetic rubber, such as a polymer of a diene, especially of a 1,3-conjugated diene, for example a polybutadiene or a polyisoprene.

The aromatic alkylene polymer is prepared continuously by a bulk polymerization, generally a free-radical polymerization, initiated either thermally or with the aid of at least one free-radical-generating polymerization initiator, especially a peroxide, a hydroperoxide or an organic perester, for example one of the initiators mentioned in Kunststoffe 80 (1990), 7, pages 830 to 837. The bulk polymerization is generally performed in the presence of the liquid monomer, and optionally in the presence of one or more hydrocarbon-based impurities accompanying the monomer, which are generally inert and with a low boiling point, such as, for example, EB, cumene, NPB, MCH and ET. The hydrocarbon-based impurity or impurities accompanying the monomer may be present in the bulk polymerization medium in an amount ranging from 0.1% to 40% and preferably from 0.5% to 30% by weight relative to the total amount of monomer used. The bulk polymerization is generally performed at a temperature ranging from 100° C. to 200° C. and preferably from 110° C. to 190° C., and at an absolute pressure ranging from 0.1 to 10 MPa and preferably from 0.1 to 6 MPa. It may be performed in one or, preferably, several reactors in series, for example reactors which are mechanically stirred reactors arranged in a loop and equipped with one or more static mixers, plug-flow stirred reactors, plug-flow reactors arranged in a loop and equipped with one or more static mixers, tubular reactors or static reactor-mixers.

The mass of polymer melt resulting from the bulk polymerization generally consists of a mixture essentially comprising the aromatic alkylene polymer formed, unreacted monomer, oligomers, optionally one or more hydrocarbon-based impurities accompanying the monomer, which are generally inert and with a low boiling point, such as, for example, EB, cumene, NPB, MCH and ET, and optionally one or more additives used during or after the polymerization, in particular lubricants such as mineral oils. The mixture which is thus subjected to the devolatilization may comprise, per 100 parts by weight of polymer, from 5 to 40 and preferably from 10 to 30 parts by weight of unreacted monomer, from 0.1 to 5 and preferably from 0.5 to 3 parts by weight of oligomers and optionally from 0.1 to 40 and preferably from 0.5 to 30 parts by weight of one or more hydrocarbon-based impurities accompanying the monomer, such as EB, cumene, NPB, MCH and ET, and/or additive(s) used during or after the polymerization, such as lubricants.

The oligomers present in the mass of polymer melt, subjected to the devolatilization, are generally formed during the polymerization, but also before or during the devolatilization when the mass of polymer is brought to a high temperature. The oligomers are generally dimers and trimers of the aromatic alkylene. In the case of the polymerization of styrene, oligomers may be essentially styrene dimers and trimers, which are especially cyclic or non-cyclic.

The mass of polymer melt is subjected to a devolatilization performed at a temperature ranging from 200 to 280° C. and preferably from 220 to 260° C., under a pressure below atmospheric pressure, in particular an absolute pressure ranging from 0.1 to 20 kPa and preferably from 0.1 to 15 kPa. The devolatilization may comprise a step of preheating the mass of polymer melt to reach the desired devolatilization temperature, this preheating especially being performed before the first step of the devolatilization. Another preheating may optionally be performed between the two successive steps of the devolatilization, so as to bring the mass of polymer melt resulting from the first step to the desired temperature for the second step. The preheating(s) may be performed using preheaters equipped with static blending means.

According to the present invention, the devolatilization is performed in at least two successive steps, especially under equivalent or successively higher vacuums. Thus, the first step may be performed at an absolute pressure ranging from 0.1 to 20 kPa, preferably from 0.5 to 15 kPa and especially from 1 to 10 kPa, whereas the second step is performed at an absolute pressure generally identical to or lower than that in the first step, for example at an absolute pressure ranging from 0.1 to 10 kPa, preferably from 0.1 to 7 kPa and especially from 0.1 to 4 kPa. The devolatilization may be performed in depressurization chambers under vacuum, in particular in which the mass of polymer melt falls by gravity in the form of threads or droplets. It is possible, for example, to carry out a devolatilization such as that described in American patents U.S. Pat. No. 3,853,672, U.S. Pat. No. 3,886,049 and U.S. Pat. No. 3,928,300. The residual monomer content of the mass of polymer melt may be such that after the first step of the devolatilization, the mass of polymer contains, per 100 parts by weight of polymer, from 0.1 to 1 part by weight of monomer, and such that after the second step, it contains less than 0.1, preferably less than 0.05 and especially less than 0.01 part by weight of monomer.

The efficiency of the devolatilization may be improved by adding to the mass of polymer melt a stripping agent preferably chosen from compounds that are insoluble (or immiscible) in the monomer, for example chosen from carbon dioxide or, preferably, water, as is described above.

The first gas stream resultant from the first step of the devolatilization is conveyed into Z1 which preferably operates under a pressure identical to or substantially identical to that prevailing in the first step of the devolatilization, and at a temperature which may range at the bottom of Z1 from 20 to 90° C. and preferably from 40 to 90° C., and at the top of Z1 from 10 to 70° C. and preferably from 20 to 60° C. The portion taken from the liquid stream L1 may be cooled to a temperature ranging, for example, from 20 to 80° C. and preferably from 40 to 80° C., so as to control and regulate especially the level of liquid in Z1. The gas stream G1 leaves at the top of Z1, and may then be advantageously recovered, for example by condensation and optionally by cooling or even supercooling, especially in the form of a liquid stream. The stream thus recovered is generally a mixture essentially comprising the monomer and in particular may comprise, per 100 parts by weight of monomer, from 0.001 to 1, preferably from 0.005 to 0.1 and especially from 0.005 to 0.05 part by weight of oligomers, and optionally from 1 to 70 and preferably from 5 to 60 parts by weight of one or more hydrocarbon-based impurities accompanying the monomer, such as EB, cumene, NPB, MCH and ET, and/or of additive(s) used during or after the polymerization, such as lubricants.

The second gas stream resulting from the second step of the devolatilization is conveyed into Z2 which preferably operates under a pressure identical to or substantially identical to that prevailing in the second step of the devolatilization, and at a temperature which may range at the bottom of Z2 from 50 to 140° C. and preferably from 60 to 130° C., and at the top of Z2 from 5 to 60° C. and preferably from 10 to 50° C. The liquid stream L3 leaves the bottom of Z2 in the form of a mixture essentially comprising the oligomers and in particular comprising, per 100 parts by weight of oligomers, from 0.01 to 10, preferably from 0.02 to 5, especially from 0.02 to 1 and in particular from 0.02 to 0.5 part by weight of monomer and possible from 0.005 to 5, preferably from 0.01 to 2, especially from 0.01 to 1 and in particular from 0.01 to 0.5 part by weight of one or more hydrocarbon-based impurities accompanying the monomer, such as EB, cumene, NPB, MCH and ET, and/or of additive (s) used during or after the polymerization, such as lubricants.

The present invention also relates to a device for the continuous manufacture of an aromatic, alkylene polymer, as illustrated diagrammatically in FIG. 1, this device comprising a zone (1) for the bulk polymerization of the aromatic alkylene, linked, for example, via a line (2), to a polymer devolatilization zone successively comprising at least one first devolatilizer DV1 and one second devolatilizer DV2, which are, for example, linked together via a line (3), so as to separate the polymer from the unreacted monomer and the oligomers formed at least partly during the polymerization, this device being characterized in that:

a line (4) for removing a gas stream from DV1 links DV1 to a first zone Z1 for direct condensation and fractionation, a top withdrawal line (5) removes from the top of Z1 a gas stream G1 essentially comprising the monomer, a bottom withdrawal line (6) removes from the bottom of Z1 a liquid stream L1 rich in oligomers, by means, for example, of a pump (7), and a recycling line (8) taking a portion of the liquid stream L1 from the bottom withdrawal line (6) links the bottom withdrawal line (6) to a cooling unit (9) and then to the first zone Z1, a line (10) for removing a gas stream from DV2 links DV2 to a second zone Z2 for direct condensation and fractionation, the bottom withdrawal line (6) links the bottom of Z1 to the second zone Z2 so as to feed Z2 with the other portion of the liquid stream L1, a top withdrawal line (11) removes from the top of Z2 a gas stream G2 comprising the monomer, and a bottom withdrawal line (14) removes from the bottom of Z2 a liquid stream L3 essentially comprising the oligomers, by means, for example, of a pump (15).

According to the present invention, it may be particularly advantageous to link the top withdrawal line (5) which removes the gas stream G1, to a condenser (16) so as to form a liquid stream, which may be cooled or even supercooled, in a line (17) for recovering the liquid stream essentially comprising the monomer. The recovery line (17) may preferably be equipped with a reflux vessel (18) and a pump (19), and may also advantageously link the condenser (16) directly or indirectly to the zone (1) for the bulk polymerization of the aromatic alkylene and/or to a unit (20) for manufacturing the aromatic alkylene. Moreover, some of the liquid stream circulating in the recovery line (17) may be advantageously taken from this line via a reflux line (21) linking the recovery line (17) to the first zone Z1, preferably to the top part (or the top half) of Z1, and especially at the top of Z1. The pressure, especially the sub-atmospheric pressure, prevailing in Z1 and in DV1 may be maintained and regulated by means of a vacuum line (22) linking the recovery line (17) or, preferably, the reflux vessel (18) to a vacuum unit (not shown in FIG. 1) arranged at the end of the vacuum line (22).

The recycling line (8), in which circulates a portion taken from the liquid stream L1 and cooled by the cooling unit (9), opens into the first zone Z1, preferably in the central part of Z1. The recycling line (8) can open into Z1 in a point (23) of Z1 such that it determines in Z1 the two separate parts by their function as described above, that is to say:

the top part (or the top half) (24) for "fractionation" or "extraction" of the heaviest compounds, especially the oligomers, and the bottom part (or the bottom half) (25) for "direct condensation" (and/or especially for "saturation").

The top part (24) of Z1 may have a height corresponding to a number of theoretical plates as mentioned above. The zone Z1 may contain an internal packing capable of offering a low pressure drop and being able especially to be chosen such that it is possible to maintain in Z1 an absolute pressure (especially a sub-atmospheric pressure) which is closest to that existing in DV1. A "structured" internal packing may be used in particular, which is known, for example, under the trade reference "Mellapak"® and sold by Sulzer Chemtech (Switzerland). Moreover, it is preferable for the line (4) for removing the gas stream from DV1 into the part of Z1 which is below the point (23) at which the recycling line (8) opens into Z1, preferably into the bottom part (or the bottom half) (25) of Z1, and especially into the bottom of Z1. The zone Z1 may advantageously be free of any conventional heating means, generally arranged at the bottom of Z1, especially free of a boiling vessel.

The line (10) for removing the gas stream from DV2 preferably opens into the bottom part (or the bottom half) of Z2, especially into the bottom of Z2. Moreover, the bottom withdrawal line (6) of Z1 may advantageously open into Z2 in a point (26) of Z2 which is above the point at which the line (10) for removing the gas stream from DV2 opens into Z2, preferably into the central part of Z2.

Moreover, the point (26) at which the withdrawal line (6) of Z1 opens into Z2 may be at a point on Z2 such that it determines in Z2 the two separate parts by their function as described above, that is to say:

the top part (or the top half) (27) for "fractionation" or "extraction" of the heaviest compounds, especially the oligomers, and the bottom part (or the bottom half) (28) for "direct condensation" (and/or especially for "saturation").

The top part (27) of Z2 may have a height corresponding to a number of theoretical plates as mentioned above. Moreover, the zone Z2 may contain an internal packing similar to that used in Z1. The zone Z2 may advantageously be free of any conventional heating means, generally arranged at the bottom of Z2, especially free of a boiling vessel.

The top withdrawal line (11) removes from the top of Z2 a gas stream G2 comprising the monomer. It may advantageously link the top Z2 directly or indirectly to the polymerization zone (1) and/or to a unit (20) for manufacturing the aromatic alkylene. It may preferably link the top of Z2 to a condenser (12) so as to form a liquid stream L2, which may be cooled or even supercooled, in a recovery line (13) which links the condenser (12) directly or indirectly to Z1, preferably to the top part (or the top half) of Z1, especially to the top of Z1. The line (13) for recovering the liquid stream L2 may be advantageously equipped with a reflux vessel (29) and a pump (30). The pressure, especially the sub-atmospheric pressure, prevailing in Z2 and DV2 may be maintained and regulated by means of a vacuum line (31) linking the recovery line (13) or, preferably, the reflux vessel (29) to a vacuum unit (not shown in FIG. 1) arranged at the end of the vacuum line (31), or preferably to the vacuum unit described above and arranged at the end of the vacuum line (22): in this case, the vacuum line (31) can open into the vacuum line (22).

The line (13) for removing the liquid stream L2 may be advantageously equipped with a chamber for fractionating the liquid stream L2, especially by phase separation (especially of a liquid phase and a gas phase) or by decantation (especially between two immiscible liquid phases), so as to purify the liquid stream L2 of monomer. The reflux vessel (29) may act as a fractionation chamber for the liquid stream L2, and may comprise a phase-separation or decantation chamber. The fractionation chamber may especially make it possible to separate the liquid stream L2 into a fraction that is volatile and difficult to condense, such as an additive or a stripping agent, for example carbon dioxide. The non-condensable fraction may especially be separated from the liquid stream L2 in the fractionation chamber, in particular in the reflux vessel (29), and may then be removed especially via the vacuum line (31). The fractionation chamber or, in particular, the reflux vessel (29) may also make it possible to separate from the liquid stream L2 a liquid phase which is immiscible with (or insoluble in) the organic liquid phase essentially comprising the monomer. It is thus possible to separate from the liquid stream L2 an additive or a stripping agent, for example water, which is immiscible with the monomer. The phase which is immiscible with the monomer may, for example, be removed from the fractionation chamber, or especially from the reflux vessel (29), via a withdrawal pipe (32).

A portion of the liquid stream L2 may be advantageously taken into the recovery line (13) before being returned into Z1 and may then be recycled to Z2 by means of a withdrawal line (33) which links the recovery line (13) to Z2, preferably to the top part (or the top half) of Z2, especially to the top of Z2. This makes it possible especially to intensify the liquid/gas contact in Z2 and to improve the extraction of the heaviest compounds, especially of the oligomers in Z2.

The liquid stream L3 taken from the bottom of Z2 is removed from the device via the bottom withdrawal line (14), especially by means of a pump (15).

The mass of polymer melt thus freed of the volatile compounds during the devolatilization may be removed from the last devolatilizer, or especially from the second devolatilizer DV2, via a line (34), and may then be conveyed, for example, into an extruder or a pelletizer (not shown in FIG. 1), so as to form polymer granules or pellets which may then be cooled to room temperature. Before conveying the mass of polymer melt into an extruder or a pelletizer, a swelling agent (or expanding agent) such as a light alkane which may contain from 4 to 6 carbon atoms, for example n-pentane and/or isopentane, may also be added thereto so as to prepare a mass of expandable polymer which, after extrusion under specific conditions, may lead to the formation either of expandable granules (or beads) of polymer or of expanded articles (or finished objects), such as expanded sheets. Processes thus designed for the continuous manufacture of an expandable or expanded aromatic alkylene polymer are described in particular in Japanese patent application JP 09 221 562 and in European patent applications EP 0 126 459, EP 0 376 671 and EP 0 668 139.

Advantageously, the line (3) linking the first devolatilizer DV1 to the second devolatilizer DV2 may be equipped with a line (35) for adding a stripping agent for facilitating the devolatilization, such as water or carbon dioxide, and a static mixer (36) capable of subsequently forming a homogeneous mixture of the mass of polymer melt with the stripping agent, especially before the second devolatilizer DV2.

The device may comprise components not shown in FIG. 1, in particular at least one preheater equipped with static blending means arranged on the line (2) and/or the line (3) before the first devolatilizer DV1 and/or the second devolatilizer DV2, so as to bring the mass of polymer melt to the desired devolatilization temperature, as described above.

Figure 2:
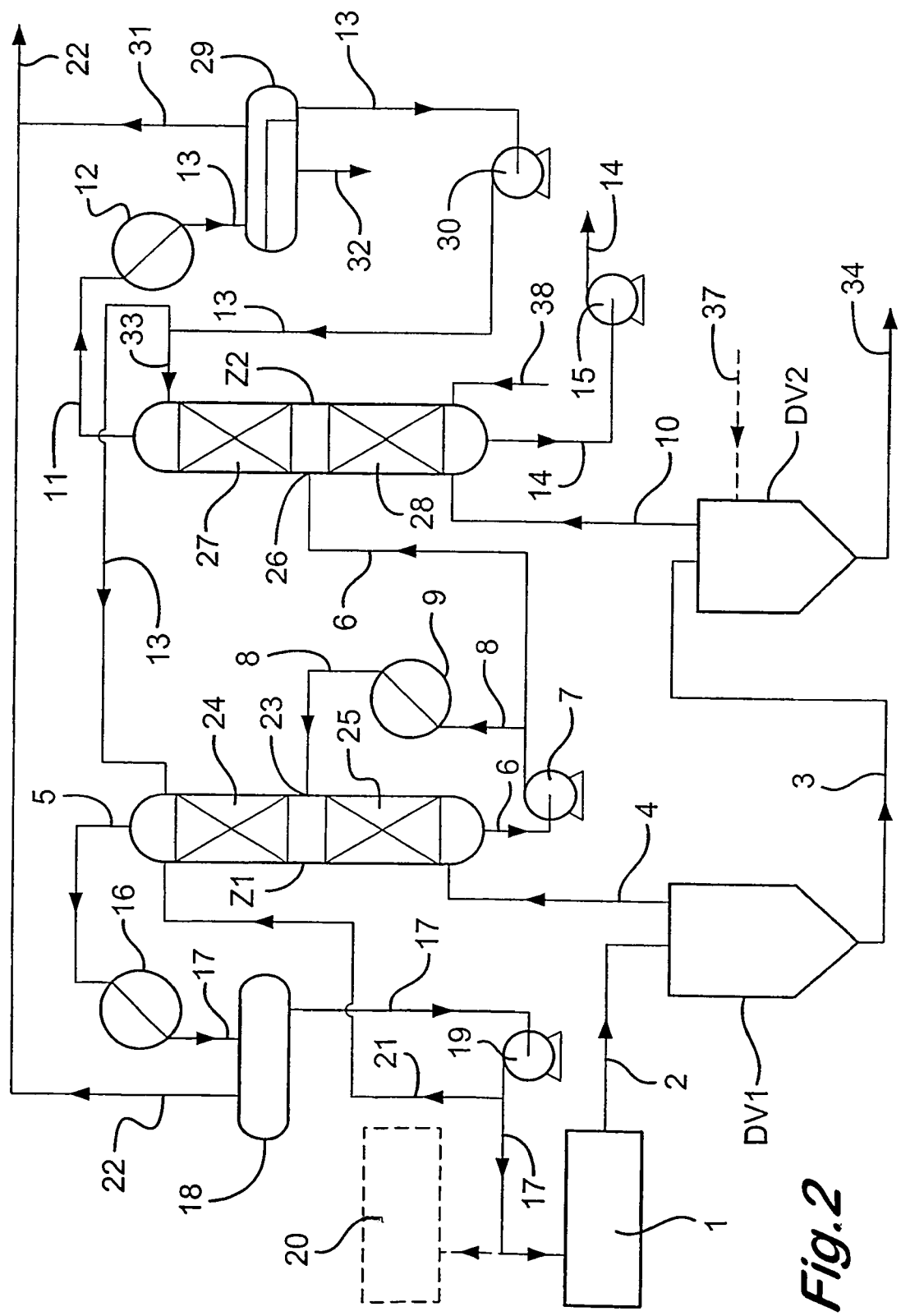

FIG. 2 is a diagrammatic representation of process and the device according to the present invention which are identical to that of FIG. 1, except for the fact that the line (3) is not equipped either with a line (35) for adding a stripping agent, or with a static mixer (36). However, the second devolatilizer DV2 is equipped with a line (37) for adding the heated steam, thus making it possible to supply heat directly into DV2 and then to bring the second gas stream resulting from the second step of the devolatilization to the desired temperature in Z2, especially at the bottom of Z2. A preferential variant may consist in supplying heat not into DV2, but directly into Z2, preferably into the bottom part of Z2, especially into the bottom of Z2. Thus, a line (38) for addition of superheated steam capable of increasing the temperature in Z2 and of improving the thermal balance of Z2 and also the separation between monomer and oligomers, may advantageously open into Z2, preferably into the bottom part of Z2, especially into the bottom of Z2. In any case, the zone Z2 may advantageously be free of any conventional heating means, such as a boiling vessel.

The present invention also relates to the use of the process and/or the device described above, in particular for the continuous manufacture of a styrene polymer, such as a homopolystyrene, a styrene copolymer having a high impact strength ("HIPS") and which is especially obtained by grafting onto a natural or synthetic rubber such as a diene (for example a polybutadiene), an expandable polystyrene especially in the form of granules or beads, or alternatively an expanded polystyrene especially in the form of expanded articles or finished objects.

The example which follows illustrates the present invention.

EXAMPLE

A polystyrene having a high impact strength ("HIPS") and modified by grafting onto a polybutadiene is continuously manufactured as represented diagrammatically in FIG. 1, in a bulk polymerization zone (1), so as to form a mass of polymer melt which is conveyed via a line (2) into a first devolatilizer DV1. The mass of polymer melt is preheated to 169° C. by passing through a preheater (not shown in FIG. 1) equipped with static blending means and arranged on the line (2). The amounts expressed in the form of "parts" hereinbelow in the present example are "parts by weight". The mass of polymer melt thus preheated contains, per 100 parts of polymer (comprising 90.6 parts of polystyrene and 9.4 parts of polybutadiene), 22.7 parts of styrene, 0.89 part of styrene oligomers and 11.61 parts of hydrocarbon-based styrene impurities (consisting essentially of a mixture of EB, cumene, NPB, MCH and ET). The mass of polymer melt is introduced, at a flow rate of 16 222 kg/h, into DV1 heated to 235° C. and under an absolute pressure of 4 kPa.

A first gas stream separated from the polymer is conveyed via a withdrawal line (4) into a first direct condensation and fraction zone Z1: it contains, per 100 parts of styrene, 2.65 parts of styrene oligomers and 51.44 parts of hydrocarbon-based styrene impurities. The first gas stream is introduced into the bottom of Z1, at a flow rate of 4 169 kg/h. The zone Z1 comprises a bottom part (25) for "direct condensation" (and especially for "saturation") and a top part (24) for "fractionation" or "extraction" of the oligomers, the height of which is equivalent to 4 theoretical plates. The zone Z1 contains internal packing known under the trade reference "Mellapak"® and sold by Sulzer Chemtech (Switzerland). The zone Z1 contains no boiling vessel, especially at the bottom. The absolute pressure in Z1 is 4 kPa. The temperature at the bottom of Z1 is 65° C., and that at the top of Z1 is 41° C. From the bottom of Z1 leaves, via a bottom withdrawal line (6), a liquid stream L1 comprising 62 parts of styrene oligomers, 25 parts of styrene and 13 parts of hydrocarbon-based styrene impurities, at a flow rate of 63 116 kg/h. A portion of the liquid stream L1 is taken from the line (6) via a recycling line (8) equipped with a cooling unit (9) which cools the liquid stream L1 to 56° C. The portion of the liquid stream L1 thus cooled is then conveyed into the central part of Z1, at a flow rate of 63 000 kg/h. At the top of Z1, a gas stream G1 leaves via a top withdrawal line (5), and is then condensed in a condenser (16) to form a styrene-rich liquid stream, comprising, per 100 parts of styrene, 0.009 part of styrene oligomers and 51.15 parts by weight of hydrocarbon-based styrene impurities, at a flow rate of 4 176 kg/h. This styrene-rich liquid stream is conveyed via a recovery line (17) into a reflux vessel (18) and is then recovered via a pump (19) and conveyed into the polymerization zone (1) and/or into a styrene manufacturing unit (20). A portion of the styren-rich liquid stream is taken from the recovery line (17) and is then returned via a reflux line (21) into the top of Z1, at a flow rate of 60 kg/h. From the reflux vessel (18) leaves a vacuum line (22) towards a vacuum unit (not shown in FIG. 1) which allows the desired pressure in Z1 and in DV1 to be maintained and regulated.

The mass of polymer melt is removed from DV1 via a line (3) at a flow rate of 12 053 kg/h: it contains, per 100 parts of polymer, 0.16 part of styrene, 0.28 part of styrene oligomers and 0.08 part of hydrocarbon-based styrene impurities. Water superheated to 190° C. is added via a line (35) to the mass of polymer melt circulating in the line (3), at a rate of 2.10 parts by weight per 100 parts by weight of polymer. The resulting mixture passes through a static mixer (36) before opening into a second devolatilizer DV2, heated to 230° C. and under an absolute pressure of 4 kPa. A gas stream separated from the polymer in DV2 is conveyed via a withdrawal line (10) into a second direct condensation and fractionation zone Z2, at a flow rate of 271.6 kg/h: it contains, per 100 parts of styrene, 1389 parts of water, 20.01 parts of styrene oligomers and 51 parts of hydrocarbon-based styrene impurities. The mass of polymer melt which leaves from the bottom of DV2 via a line (34) at a flow rate of 12 500 kg/h contains, per 100 parts of polymer, less than 0.01 part of styrene, less than 0.01 part of hydrocarbon-based styrene impurities and 0.25 part of styrene oligomers. It is conveyed via line (34) to an extruder or a pelletizer (not shown in FIG. 1) to form polymer pellets.

The second gas stream separated from the polymer in DV2 feeds, via the line (10), the bottom of Z2. The zone Z2 comprises a bottom part (28) for "direct condensation" (and especially "saturation") and a top part (27) for "fractionation" or "extraction" of the oligomers, the height of which is equivalent to 4 theoretical plates. The zone Z2 contains an internal packing known under the trade reference "Mellapak"® and sold by Sulzer Chemtech (Switzerland). The zone Z2 contains no boiling vessel, especially at the bottom. The absolute pressure in Z2 is 4 kPa. The temperature at the bottom of Z2 is 122° C., and that at the top of Z2 is 25° C. From the bottom of Z2 leaves, via a bottom withdrawal line (14), an oligomer-rich liquid stream L3, comprising 99.7 parts of styrene oligomers, 0.1 part of styrene and 0.05 part of hydrocarbon-based styrene impurities. The other portion of the liquid stream L1 feeds, via the line (6), the central part of Z2, at a flow rate of 116 kg/h. From the top of Z2 leaves, via a top withdrawal line (11), a gas stream G2 which essentially comprises water and styrene and which is condensed in a condenser (12) to form a liquid stream L2 which is then conveyed via a recovery line (13) into a reflux vessel (29). A vacuum line (31) leaves the reflux vessel (29) and joins the line (22) linked to the vacuum unit mentioned above, so as to maintain and regulate the desired pressure in Z2 and in DV2. In the reflux vessel (29) an aqueous phase is separated from the liquid stream L2 and leaves from the bottom of the vessel via a line (32). The organic phase of the liquid stream L2 lying above the aqueous phase is recovered at a temperature of 25° C. outside the vessel (29) via a recovery line (13) and via a pump (30), and is then conveyed into the top of Z1 via the line (13) at a flow rate of 63 kg/h. A portion of the liquid stream L2 is taken from the line (13) via a withdrawal line (33) and is then returned into the top of Z2 at a flow rate of 180 kg/h.

The invention claimed is:

1. In a process for the continuous manufacture of an aromatic alkylene polymer in which an aromatic alkylene monomer is bulk polymerized to form a mass of polymer which is then subjected to a devolatilization process in at least two successive steps to separate polymer from unreacted monomer and oligomers formed at least partially during the polymerization, the improvement comprising:

separating a first gas stream from the polymer in a first step of the devolatilization process, conveying the separated first gas stream to a first zone Z1 for direct condensation and fractionation, removing a gas stream G1 comprising essentially monomer from a top zone of Z1, while removing a liquid stream L1 rich in oligomers from a bottom of zone Z1, cooling a portion of the liquid stream L1 and then returning the cooled portion to zone Z1 so as to partially condense by direct contact the first gas stream in zone Z1, and separating a second gas stream from the polymer in a second step of the devolatilization process, conveying the separated second gas stream to a second zone Z2 for direct condensation and fractionation, feeding another portion of the liquid stream L1 from zone Z1 to zone Z2 so as to partially condense by direct contact the second gas stream in zone Z2, and removing a gas stream G2 comprising monomer from a top of zone Z2, while removing a liquid stream L3 comprising oligomers from a bottom of zone Z2.

2. The process of claim 1, wherein at least a portion of the gas stream G1 removed from the top of zone Z1 is recovered and is then recycled directly or indirectly into the polymerization of the aromatic alkylene monomer.

3. The process of claim 2, wherein the recovered portion of the gas stream G1 is condensed and optionally cooled and is recycled in the form of a liquid stream.

4. The process of claim 1 or 2, wherein at least another portion of the gas stream G1 removed from the top of zone Z1 is recovered and returned, after condensation and optionally cooling, in the form of a liquid stream into zone Z1.

5. The process of claim 4, wherein the recovered another portion of the gas stream G1 is returned into a top part of zone Z1.

6. The process of claim 5, wherein the recovered another portion of the gas stream G1 is returned into the top of zone Z1.

7. The process of claim 1 or 2, wherein a point of return of the cooled portion of the liquid stream L1 is at a point in zone Z1 such that it delimits in zone Z1 a top part for fractionation of the oligomers, and a bottom part for direct condensation.

8. The process of claim 1 or 2, wherein a point of return of the cooled portion of the liquid stream L1 is located in a central part of zone Z1.

9. The process of claim 1, wherein the first gas stream separated in the first step of the devolatilization process is conveyed into a part of zone Z1 which is below a point of return of the cooled portion of the liquid stream L1 into zone Z1.

10. The process of claim 9, wherein the cooled portion of the liquid stream L1 is returned to a bottom part of zone Z1.

11. The process of claim 10, wherein the cooled portion of the liquid stream L1 is returned to the bottom of zone Z1.

12. The process of claim 1, wherein the another portion of the liquid stream L1 is fed to zone Z2 at a point in zone Z2 which is above a point at which the second gas stream separated in the second step of the devolatilization process is conveyed into zone Z2.

13. The process of claim 1, wherein the second gas stream separated in the second step of the devolatilization process is conveyed into a bottom part of zone Z2.

14. The process of claim 13, wherein the second gas stream is conveyed into the bottom of zone Z2.

15. The process of claim 1, wherein a point at which zone Z2 is fed with the another portion of the liquid stream L1 is at a point in zone Z2 such that it delimits in zone Z2 a top part for fractionation of the oligomers, and a bottom part for direct condensation.

16. The process of claim 1, wherein the gas stream G2 removed from the top of zone Z2 is condensed and optionally cooled so as to form a liquid stream L2.

17. The process of claim 16, wherein the liquid stream L2 is at least partly conveyed directly or indirectly into zone Z1.

18. The process of claim 17, wherein said part of the liquid stream L2 is conveyed into a top part of zone Z1.

19. The process of claim 18, wherein said part of the liquid stream L2 is conveyed into a top of zone Z1.

20. The process of claim 16 or 17, wherein a portion of the liquid stream L2 is returned into zone Z2.

21. The process of claim 20, wherein said portion of the liquid stream L2 is returned into a top part of zone Z2.

22. The process of claim 21, wherein said portion of the liquid stream L2 is returned to the top of zone Z2.

23. The process of claim 1, wherein the gas stream G2 removed from the top of Z2 is condensed and optionally cooled so as to form a liquid stream L2 and is then fractionated by phase separation or by decantation, so as to isolate a purified liquid stream essentially containing the monomer.

24. The process of claim 1, including adding a stripping agent for facilitating the devolatilization to the mass of polymer between the two successive steps of the devolatilization process.

25. The process of claim 24, wherein the stripping agent is water or carbon dioxide.

26. The process of claim 1, including adding superheated steam to the mass of polymer during the second step of the devolatilization process, or to the second gas stream separated in the second step of the devolatilization process, before or after it has been introduced into zone Z2.

* * * * *